Patented Sept. 7, 1937

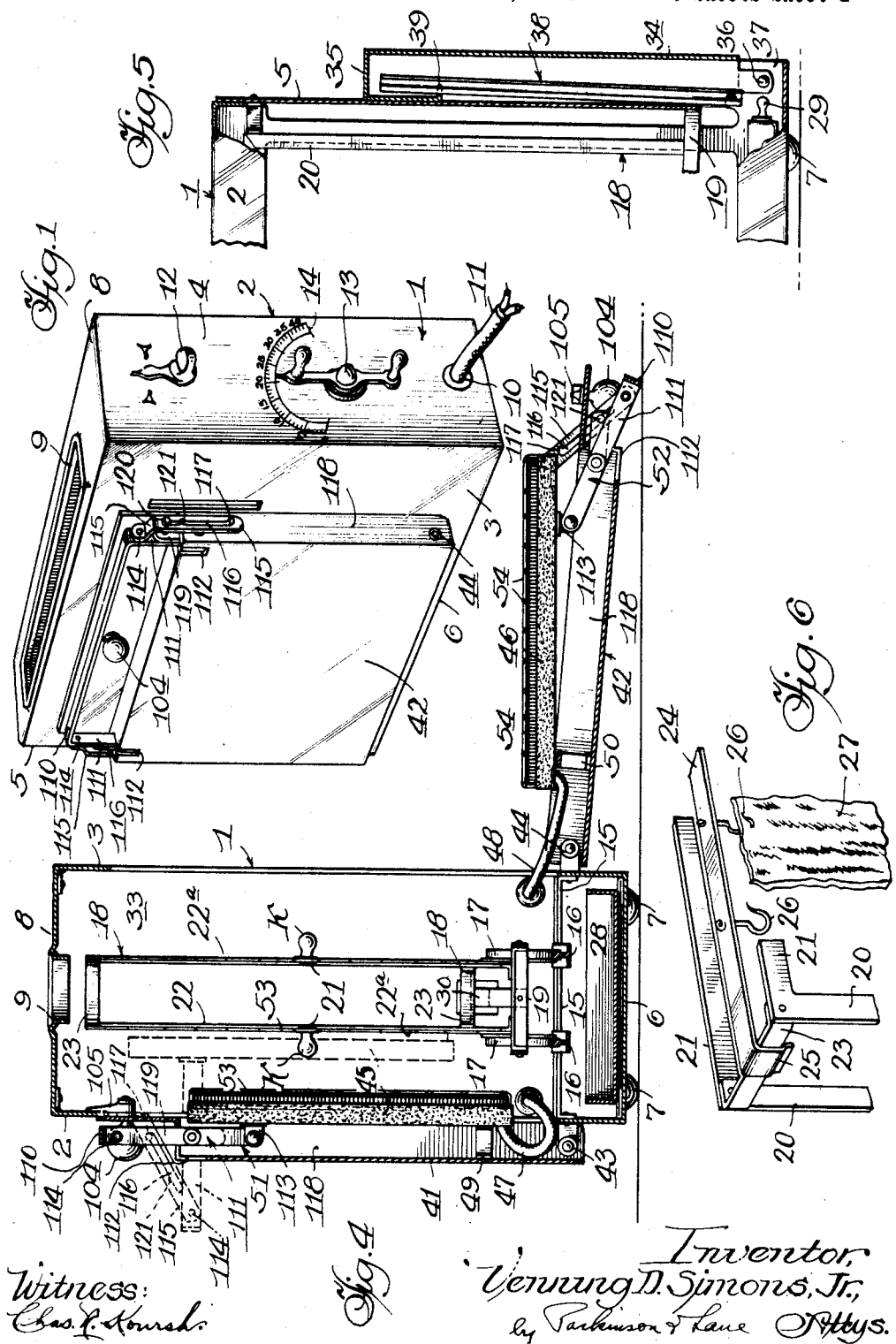

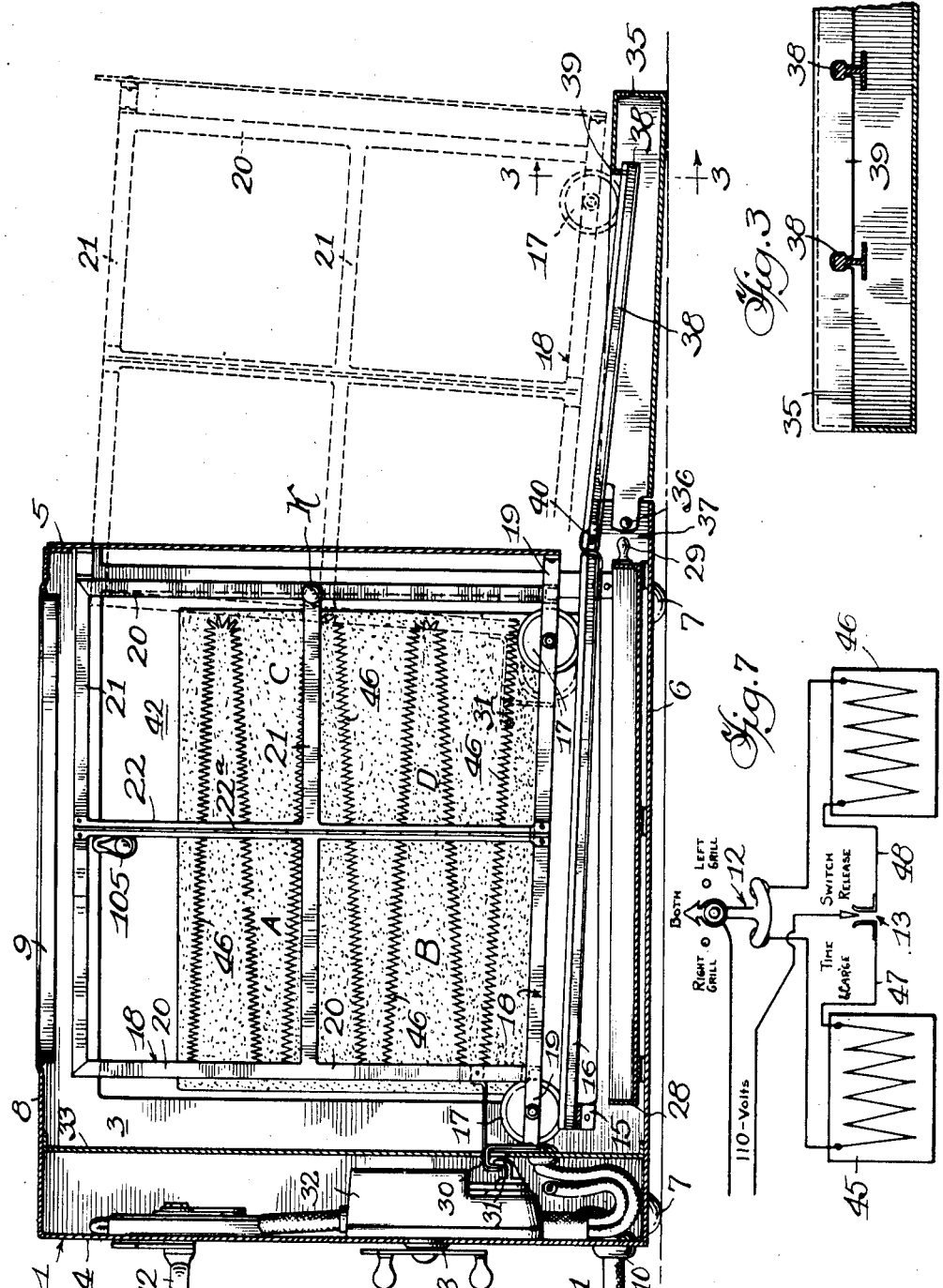

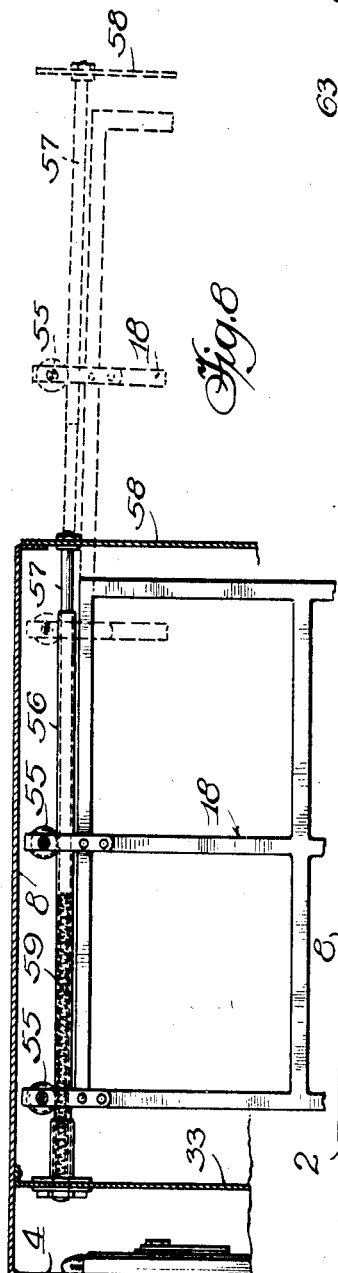

2,092,226

UNITED STATES PATENT OFFICE 2,092,226

AUTOMATIC BROILER AND TOASTER

Venning D. Simons, Jr., Chicago, Ill.

Application November 7, 1934, Serial No. 751,824

2 Claims. (Cl. 219—19)

My invention relates to broilers or toasters and more particularly to such devices which are operated by electricity and are controlled by a time clock.

An object of my invention is to provide a cooking device that will not only broil bacon, chops, steaks or the like, but will also toast bread and in addition is adapted to be used as a grill or as a small electric stove.

It is well known that in the ordinary manner of preparing bacon, steaks, chops, etc., the article is cooked first on one side and then on the other. With my device it may be cooked on both sides at once resulting in faster cooking and a substantially greaseless food. When cooked in my device the juice of steaks, etc. is collected in a pan under the meat and is ready for use either on the food or for the purpose of making gravy. Bread is toasted in like manner. When desired to be used as a stove for cooking small articles of food, one side of the device containing one of the heating elements is adapted to be placed in a horizontal position and only that element is turned on. Either or both sides may be used in this manner, and the toaster may, therefore, be put to a variety of uses and is not limited to toasting bread.

Further objects are to provide a construction of maximum simplicity, efficiency, economy and ease of assembly and operation; and such further objects, advantages and capabilities as will later more fully appear, and are inherently possessed thereby.

The invention further resides in the combination, construction and arrangements of parts illustrated in the accompanying drawings, and while there is shown therein a preferred embodiment, it is to be understood that the same is susceptible of modification and change, and comprehends other details, arrangements of parts, features and constructions, without departing from the spirit of the invention.

In the drawings—

Fig. 1 is a perspective view of my device.

Fig. 2 is a view in vertical cross-section with sections broken away and with the end lowered and showing the device in position to be used as a toaster.

Fig. 3 is a sectional view taken on the line 3—3 of Fig. 2.

Fig. 4 is a view in vertical cross-section of the device in position to be used as a grill.

Fig. 5 is a fragmentary view, part in vertical cross-section and part in side elevation, of the rear end of the device with the end wall or closure in raised or closed position.

Fig. 6 is a fragmentary view in perspective of the top of the carriage and showing means for fastening the strips of bacon thereto.

Fig. 7 is a diagram of the electric wiring.

Fig. 8 is a view, part in side elevation and part in vertical cross-section, of the top of my device showing an alternate track construction.

Fig. 9 is a view in vertical cross-section of an alternate carriage construction.

Fig. 10 is a view on the line 10—10 of Fig. 9.

Fig. 11 is an alternate carriage construction in a view similar to Fig. 10.

Referring more in detail to the drawings of the embodiment selected to illustrate my invention, 1 represents the casing of my broiler-toaster, having sides 2 and 3, front 4 and rear or end wall 5. In the bottom 6 are provided knobs 7 made of rubber or the like for insulating the device and protecting the surface on which the device is placed and to keep the said device from slipping thereon. The top 8 may be provided with an elongated opening 9 for ventilation purposes and dissipation of the heat generated therein.

In the front or end wall of the device is an opening 10 to receive the electric wires 11. Also mounted on the front or end wall is a switch 12 for control of the heating elements and a switch 13 connected to the time clock referred to later. The switch 12 for the heating elements connects both elements when the pointer is turned upwardly as shown in Figs. 1 and 7. When the pointer is turned to the right the right heating element only is connected and when turned to the left, the left element alone is connected. The switch 13 is used in connection with the dial 14 to automatically determine the length of time the current is to be on. When the switch is positioned so that the indicator is at zero, the current is "off". When the indicator is moved to the right the current is "on" for the amount of time desired, at the end of which a spring (not shown) will return the indicator to zero position, or this may be manually accomplished.

Inside the device and spaced from the bottom thereof by means of brackets or cross bars 15 are rails 16 on which wheels or rollers 17 of the carriage 18 are adapted to run. It will be noted that the rails are higher in front than in the rear, so that after the carriage is released, it will move by gravity down the inclined track. The carriage consists of a base or floor 18 from which are suspended supports 19 for the wheels or rollers and a frame work consisting of end pieces 20, side pieces 21, intermediate pieces 22 and cross pieces 23. The intermediate piece 22 on each side is vertically hinged at 22a and the top and intermediate piece 21 is also hinged to provide a means for inserting bread into the frame. Four compartments, A, B, C, D are provided, the bread in compartments A and C resting on the bread in B and D. Knob K is provided for opening and shutting the hinged part. Bread to be toasted may be inserted into this carriage from the top or end thereof. There is also provided a strip of metal or the like 24 having flanges 25 adapted to be sprung over the cross pieces 23. This strip may be permanently attached to the carrier if desired, in which case bread may be inserted into the carriage from the end thereof only. From the bottom of this strip extend hooks 26 from which may be suspended bacon or other meat to be cooked.

The base of the carriage is provided with a plurality of large holes or a slot so that the grease or juice from the cooked food will escape therethrough into a pan 28 on the floor 6 of the device and under the track for the wheels. This pan may be withdrawn by means of handle 29 when it is desired to empty and/or clean it.

On the front of the carriage projects a hook 30 which is adapted to contact and be retained by depressible hook 31 on and controlled by time switch 32. The time switch and other electrical parts are separated from the rest of the device by partition 33 in which are holes for the admission of hook 30 and the wires to and from the heating elements.

The rear or end wall 5 of the device is attached to the carriage and there is provided a track extension 34 having an inwardly and downwardly extending flange 35 and hinged at 36 to extensions 37 of the sides of the device. The track extension is provided with rails 38 which are so constructed as to form extension of rails 16 when the extension is lowered. The flange 35 is provided with a member or flange 39 which acts as a stop for the rails and also a sliding support for one end thereof. The other end is supported at 40. These rails also slope downwardly.

In operation the carriage is pushed manually into the device where it is held in place by hook 30 engaging hook 31. The article to be cooked having been placed in the carriage, the switch 12 is set for both elements to be on, and the time switch is set. When the current goes "off" as described above another spring or other suitable means are provided for depressing hook 31 and the carriage is released. Due to the slant or inclination of the rails, the carriage will run out of the device through the force of gravity and will roll until it strikes the stop 39 where the cooked food will be removed and replaced by other food to be cooked.

In the sides 2 and 3 of the device are pivotally mounted closures or sides 41 and 42 hinged at 43 and 44 and to which are attached the heating elements 45 and 46. Wires 47 and 48 connect the heating elements to the switches and electrical source or current supply. The heating elements are supported by brackets 49 and 50 and are connected to the closures or sides 41 and 42 and lever arms 51 and 52 whereby, when a closure or side is lowered so that the upper end thereof is in contact with the table or other support for the device, the heating elements and guards therefor 53 and 54, are substantially horizontal or parallel with said support. The guards 53 and 54 protect the elements from injury and also serve as a plate or supports on which pans, etc., may be placed when the device is used as a grill or stove. Each side is raised or lowered by means of handle 104 which also operates catch 105 to lock or unlock the closure or side in the device. The guards may be made detachable if desired.

Inasmuch as the heating elements must be placed near to the bread when it is toasted and farther away when meat is being cooked, applicant has provided for adjusting or moving the heating elements toward and away from the carriage. This means comprises lever arms 51 and 52 which include a handle or cross arm 110 on the outside of the door and having projecting arms 111 which extend through slots or openings 112 to the interior of the box where the ends thereof are pivoted to brackets 113 on the heating element container. Pivoted at 114 to the arms and near the top thereof are elongated bent brackets or lugs 115 in which are slots 116 having offsets 117 at the bottom thereof. Rigidly secured to the sides 118 of the closure or side 41 is bar 119 having pin or lug 120 extending through slot 116 in bracket 115. The elements are in position for cooking meat in Fig. 1 and in full lines in Fig. 4. The dotted lines in Fig. 4 show the elements in position for toasting bread.

The elements are moved by manipulation of handle 110 and are locked in position for toasting bread when pin 120 slides into offset 117. Offset 121 is also provided in slot 116 to anchor pin 120 therein to hold the door in position to be used as a stove as shown in Fig. 4.

In the alternate structure shown in Fig. 8 the carriage runs on overhead wheels or rollers 55 on track or rail 56 having telescopic extension 57 to which is rigidly attached end wall 58 in the rear of the device. When the door is closed manually spring 59 is compressed in hollow rail 56 in which is a catch (not shown) for holding it. When the current goes "off" the catch is released automatically by suitable apparatus (not shown) and the inner rail and door are pushed outwardly by spring 59. The track 56 slants or inclines downwardly slightly toward the rear of the device and the inner rail, being smaller than the inner surface of the outer rail will tend to dip downwardly slightly, so that the carriage will roll out by force of gravity.

It is to be understood that spring 59 may be dispensed with and that the carriage may be equipped with a hook similar to hook 30 (Fig. 2) in which case the device will operate exactly as when the rails below the carriage are used. In such a construction the inner rail is pulled out manually and left out while the device is in use.

In Figs. 9–11 another alternate construction is disclosed. In this construction the rear door and tracks are dispensed with. The carriage 18 is pivotally attached to an end wall 5 and partition 33 by lever arms 60. Springs 61 normally hold the carriage in the position shown in dotted lines in Fig. 10. The side or closure 41 is provided with spring catch 62 in this embodiment. The pivotal mounting 43a is provided with a spring or suitable tension means which will raise the end or closure to closed position.

In operation the carriage is loaded as before and is pushed manually into the device where it is held by a catch similar to that shown at 31 in Fig. 2. When the catch is released by the time clock mechanism the action of the springs 61 pulls the carriage outwardly, and being sufficiently powerful to overcome the catch 62 and the spring pivotal mounting 43a of the door, the latter is opened and the carriage is in position to be emptied and reloaded.

In Fig. 11 the casing is similar to that shown in Figs, 9 and 10, but the carriage is pivoted only at one end and the free end is caught by the time clock catch. In this construction bracket 63 on the rear end of the device is pivoted at 64 to bracket 65 on the carriage. Spring 66 is adapted, when the catch is released, to swing the carriage on a vertical pivot to open the door to a position to be reloaded.

Having thus disclosed my invention,
I claim:

1. In a cooking device, a casing having electrical heating elements in the sides thereof and controlled by a time clock switch, said sides being adapted to be moved to substantially right angles to said casing whereby they may be used as a stove, a track in said casing, a track hinged to the back of said casing and adapted to be moved to a position whereby it forms a continuation of the first track outside said casing, a carriage in said casing and on said first track and adapted to be run onto said second track, means for retaining said carriage in said casing and means for releasing said carriage whereby it will run by force of gravity onto said second track and out of said casing.

2. In a cooking device, a casing having heating elements in the sides thereof, said sides being adapted to be moved to substantially right angles to said casing whereby they may be used as a stove, a track in said casing, a track hinged to the back of said casing and adapted to be moved to a position whereby it forms a continuation of the first track outside said casing, a carriage in said casing and on said first track and adapted to be run onto said second track.

VENNING D. SIMONS, Jr.